US009507719B2

(12) United States Patent
Venkata

(10) Patent No.: US 9,507,719 B2
(45) Date of Patent: Nov. 29, 2016

(54) GARBAGE COLLECTION IN HYBRID MEMORY SYSTEM

(71) Applicant: Seagate Technology LLC, Cupertino, CA (US)

(72) Inventor: Sumanth Jannyavula Venkata, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 148 days.

(21) Appl. No.: 13/971,770

(22) Filed: Aug. 20, 2013

(65) Prior Publication Data

US 2015/0058525 A1 Feb. 26, 2015

(51) Int. Cl.
G06F 13/00 (2006.01)
G06F 12/08 (2016.01)
G06F 12/02 (2006.01)

(52) U.S. Cl.
CPC ....... *G06F 12/0866* (2013.01); *G06F 12/0246* (2013.01); *G06F 2212/217* (2013.01); *G06F 2212/7205* (2013.01)

(58) Field of Classification Search
None
See application file for complete search history.

(56) References Cited

U.S. PATENT DOCUMENTS

| 5,274,768 | A | 12/1993 | Traw et al. |
| 5,420,998 | A | 5/1995 | Horning |
| 5,644,789 | A | 7/1997 | Matthews et al. |
| 6,339,811 | B1 | 1/2002 | Gaertner et al. |
| 6,549,992 | B1 | 4/2003 | Armangau et al. |
| 6,948,015 | B2 * | 9/2005 | Ogasawara et al. ............ 710/74 |
| 7,305,526 | B2 | 12/2007 | Benhase et al. |
| 7,613,876 | B2 | 11/2009 | Bruce et al. |
| 7,979,631 | B2 | 7/2011 | Ahn et al. |
| 8,015,360 | B2 | 9/2011 | Hong et al. |
| 8,032,700 | B2 | 10/2011 | Bruce et al. |
| 8,180,964 | B1 | 5/2012 | Koh et al. |
| 8,341,339 | B1 | 12/2012 | Boyle et al. |
| 8,489,820 | B1 | 7/2013 | Ellard |
| 8,583,879 | B2 | 11/2013 | Na et al. |
| 2002/0002655 | A1 * | 1/2002 | Hoskins ........................ 711/112 |
| 2002/0176430 | A1 | 11/2002 | Sangha et al. |
| 2003/0105937 | A1 | 6/2003 | Cooksey et al. |
| 2003/0105938 | A1 | 6/2003 | Cooksey et al. |
| 2003/0105940 | A1 | 6/2003 | Cooksey et al. |
| 2003/0196042 | A1 * | 10/2003 | Hopeman et al. ............ 711/133 |
| 2003/0200393 | A1 | 10/2003 | Cornaby et al. |

(Continued)

FOREIGN PATENT DOCUMENTS

EP 1890236 2/2008

OTHER PUBLICATIONS

U.S. Appl. No. 13/542,990, filed Jul. 6, 2012, Sawin et al.

(Continued)

*Primary Examiner* — Midys Rojas
*Assistant Examiner* — Stephanie Wu
(74) *Attorney, Agent, or Firm* — Hollingsworth Davis, LLC

(57) ABSTRACT

A hybrid memory system includes a primary memory and a secondary memory. A garbage collection operation is performed on the hybrid memory system. A read operation comprising reading data from a first cluster of a plurality of clusters is performed. Responsive to a determination that the read operation failed, the first cluster is unmapped without writing the data to a second cluster and the first cluster continues to be used for subsequent data storage. Responsive to a determination that the read operation did not fail, data is written to the second cluster.

20 Claims, 8 Drawing Sheets

(56) References Cited

U.S. PATENT DOCUMENTS

| | | |
|---|---|---|
| 2004/0123043 A1 | 6/2004 | Rotithor et al. |
| 2005/0108491 A1 | 5/2005 | Wong et al. |
| 2005/0172074 A1 | 8/2005 | Sinclair |
| 2006/0248387 A1 | 11/2006 | Nicholson et al. |
| 2007/0022241 A1 | 1/2007 | Sinclair |
| 2007/0136523 A1 | 6/2007 | Bonella et al. |
| 2007/0250665 A1* | 10/2007 | Shimada ............... 711/130 |
| 2008/0059694 A1 | 3/2008 | Lee |
| 2009/0106481 A1 | 4/2009 | Yang et al. |
| 2010/0023682 A1 | 1/2010 | Lee |
| 2010/0115172 A1* | 5/2010 | Gillingham et al. ....... 710/310 |
| 2010/0217952 A1 | 8/2010 | Iyer et al. |
| 2010/0325352 A1 | 12/2010 | Schuette et al. |
| 2011/0145489 A1 | 6/2011 | Yu et al. |
| 2012/0191936 A1* | 7/2012 | Ebsen et al. ............... 711/170 |
| 2012/0210041 A1 | 8/2012 | Flynn et al. |
| 2012/0266175 A1 | 10/2012 | Zheng |
| 2012/0311237 A1 | 12/2012 | Park |
| 2012/0317364 A1 | 12/2012 | Loh |
| 2013/0024625 A1 | 1/2013 | Benhase et al. |
| 2013/0191601 A1 | 7/2013 | Peterson et al. |
| 2013/0246688 A1* | 9/2013 | Kanno et al. ............... 711/103 |
| 2013/0268728 A1 | 10/2013 | Ramanujan et al. |
| 2013/0339617 A1 | 12/2013 | Averbouch et al. |
| 2014/0013026 A1* | 1/2014 | Jannyavula Venkata et al. ............... 711/103 |
| 2014/0013027 A1* | 1/2014 | Jannyavula Venkata et al. ............... 711/103 |
| 2014/0207997 A1* | 7/2014 | Peterson et al. ............... 711/103 |
| 2014/0241092 A1* | 8/2014 | Ha ............... G11C 29/00 365/218 |
| 2015/0058683 A1 | 2/2015 | Venkata et al. |

OTHER PUBLICATIONS

U.S. Appl. No. 13/543,036, filed Jul. 6, 2012, Sawin et al.
U.S. Appl. No. 13/543,079, filed Jul. 6, 2012, Venkata et al.
U.S. Appl. No. 13/543,100, filed Jul. 6, 2012, Venkata et al.
U.S. Appl. No. 13/543,123, filed Jul. 6, 2012, Sawin et al.
U.S. Appl. No. 13/543,303, filed Jul. 6, 2012, Venkata et al.
Hallnor et al., "A Fully Associative Software-Managed Cache Design", ISCA '00 Proceedings of the 27$^{th}$ Annual International Symposium on Computer Architecture, 2000, pp. 107-116.
Ahmadi et al., "A Cache Architecture for Counting Bloom Filters", 15$^{th}$ IEEE International Conference on Networks, 2007, pp. 218-223.
File History for U.S. Appl. No. 13/543,303.
File History for U.S. Appl. No. 13/543,100.

* cited by examiner

GARBAGE COLLECTION IN HYBRID MEMORY SYSTEM

SUMMARY

According to some embodiments, a memory device includes a hybrid controller configured to manage data transfers between a host processor and a secondary memory. The secondary memory is configured to serve as a cache for a primary memory. The controller is configured to perform a read operation comprising reading data from a first cluster of a of a plurality of clusters of the secondary memory. Responsive to a determination that the read operation failed, the controller is configured to unmap the first cluster without writing the data to a second cluster and continuing to use the first cluster for subsequent data storage. Responsive to a determination that the read operation did not fail, the controller is configured to write the data to the second cluster.

Some embodiments involve a method of performing garbage collection in a hybrid memory system that includes a primary memory and a secondary memory. A read operation is performed, the read operation comprising reading data from a first cluster of a plurality of clusters. Responsive to a determination that the read operation failed, the first cluster is unmapped without writing the data to a second cluster and continuing to use the first cluster for subsequent data storage. Responsive to a determination that the read operation did not fail, the data is written to the second cluster.

Some embodiments include a controller system for a hybrid memory system, the controller comprising a hybrid controller configured data transfers between the host processor and a flash memory, the flash memory configured to serve as a cache for a magnetic disk. The controller is configured to perform a read operation comprising reading data from a first cluster of a of a plurality of clusters of the secondary memory. Responsive to a determination that the read operation failed, the controller is configured to unmap the first cluster without writing the data to a second cluster and continuing to use the first cluster for subsequent data storage. Responsive to a determination that the read operation did not fail, the controller is configured to write the data to the second cluster.

These and other features and aspects of the various embodiments disclosed herein can be understood in view of the following detailed discussion and the accompanying drawings.

DETAILED DESCRIPTION

Some memory devices use at least two types of memory in a hybrid or tiered memory system, where at least one type of memory is used as a primary memory and at least one other type of memory is used as a secondary memory that may operate as a cache. The primary memory may have greater storage capacity but slower access times than the secondary memory, for example. In this arrangement, the secondary memory can serve as a read cache and/or a write cache for the primary memory. One example of such a tiered memory device is a hybrid drive, in which the primary memory may comprise nonvolatile memory such as magnetic disk, magnetic tape, and/or optical disk and the secondary memory may comprise solid state flash memory, and/or the secondary memory may be a nonvolatile or volatile memory with or without battery backup. Note that the terms "primary memory", "main memory", and "secondary memory" are used herein for identification of components used in a hybrid memory system and to denote differences in memory (e.g., usage, capacity, performance, memory class or type, etc.) and not necessarily order or preference. Furthermore, although examples provided herein refer to the primary memory as magnetic disk and to secondary memory as flash memory, the disclosed approaches are applicable to any types of primary and secondary memory.

Embodiments described herein relate to systems and methods for garbage collection in a hybrid memory system that includes a primary memory, e.g., a magnetic disk and a secondary memory, e.g., a nonvolatile flash. Some embodiments take into account that a hybrid system may continue to use a memory unit in the secondary memory if a read of the secondary memory fails. There may be less concern for losing the data in the secondary memory because a second copy of the data is stored on the primary memory, i.e., the magnetic disk.

Figure 1A:
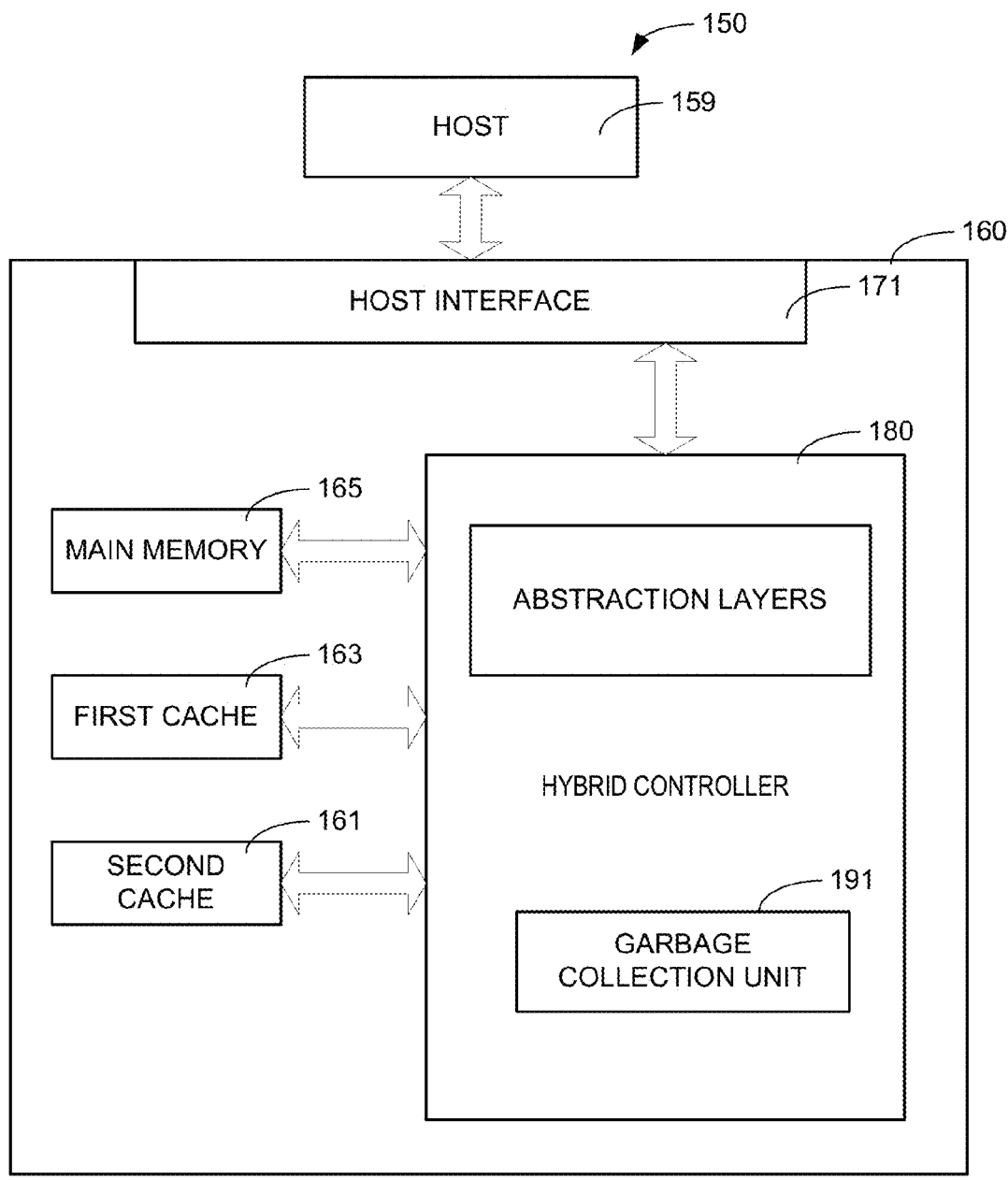
FIG. 1A is a block diagram of a hybrid memory system configured to manage memory access requests in accordance with some embodiments.

FIG. 1A is a diagram of a system 150 that includes a hybrid memory 160 comprising a number of memory components including a main memory 165, a first cache 163 and a second cache 161. The hybrid memory 160 is capable of being coupled to a host processor 159 through a host interface 171. The host interface 171 communicatively couples the host processor 159 to a hybrid controller 180. The first cache 163 and the second cache 161 can be configured to temporarily store data transferred to or from the host 159 to enhance throughput to the main memory 165. The main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory are referred to herein as host LBAs.

The host 159 sends memory access requests to the hybrid drive 160 to read or write data. The memory access requests may specify a host LBA range used for the operation of the memory access request. For example, a memory access request from the host 159 may request that a host LBA range be written to the hybrid drive 160 and/or a memory access request may request that a host LBA range be read from the hybrid drive 160. The memory access requests received from the host 159 are managed by the hybrid controller 180 to cause data to be written to and/or read from the hybrid drive with optimal efficiency. The second cache 161 in this example may optionally be a type of read cache referred to as read-only, in that only data marked for read operations by the host 159 are placed in the second cache 161. In such a configuration, data marked for writing to the main memory 165 are sent to the main storage 165, either directly or via the first cache 163. The controller 180 controls data flow between the host interface 171 and the various memories 161, 163, 165 of the hybrid drive 160. The controller 180 also includes modules for maintaining memory functionality including a garbage collection unit 191 for coordinating garbage collection processes for the first cache, second cache, and main memory.

According to some embodiments, the hybrid memory device 160 (also referred to herein as a "hybrid drive") may be implemented using a controller 180 configured as a hierarchy of abstraction layers. Pairs of the abstraction layers are communicatively coupled through application programming interfaces (APIs). The organization of the hybrid controller 180 into abstraction layers to some extent allows each layer to work relatively independently and/or can reduce potential conflicts that arise from processing multiple threads of execution. For purposes of discussion, some examples provided below are based on the use of a magnetic disk as the main memory, dynamic random access memory as the first (or primary) cache, and solid state flash memory as the second (or secondary) cache. It will be apparent to those skilled in the art that the various memory components 161, 163, 165 are not restricted to these types of memory and may be implemented using a wide variety of memory types.

In some configurations, the cache 161 may be configured as a secondary cache, and may be faster and smaller than the main storage 165. The cache 163 is a primary cache, and may be faster and smaller than the secondary cache 161. For example, current read/write requests from the host 159 may be processed first via the primary cache 163 (e.g., identified by the data's logical block address). This enables host commands to complete quickly should the requested data be stored in the primary cache 163. For host read requests, if there is a miss in the primary cache 163 i.e., the requested data is not present in the primary cache, the requested data may be searched for in the secondary cache 161. If not found in either, requested data may be accessed via the main storage 165.

Some of the data stored in the primary cache 163 may either be copied or moved to the secondary cache 161 as new requests come in. The copying/movement from primary cache 163 to secondary cache 161 may also occur in response to other events, e.g., a background scan. Both copying and moving involve placing a copy of data associated with an LBA range in the secondary cache, and moving may further involve freeing up some the LBA range in the primary cache for other uses, e.g., storing newly cached data.

Figure 1B:
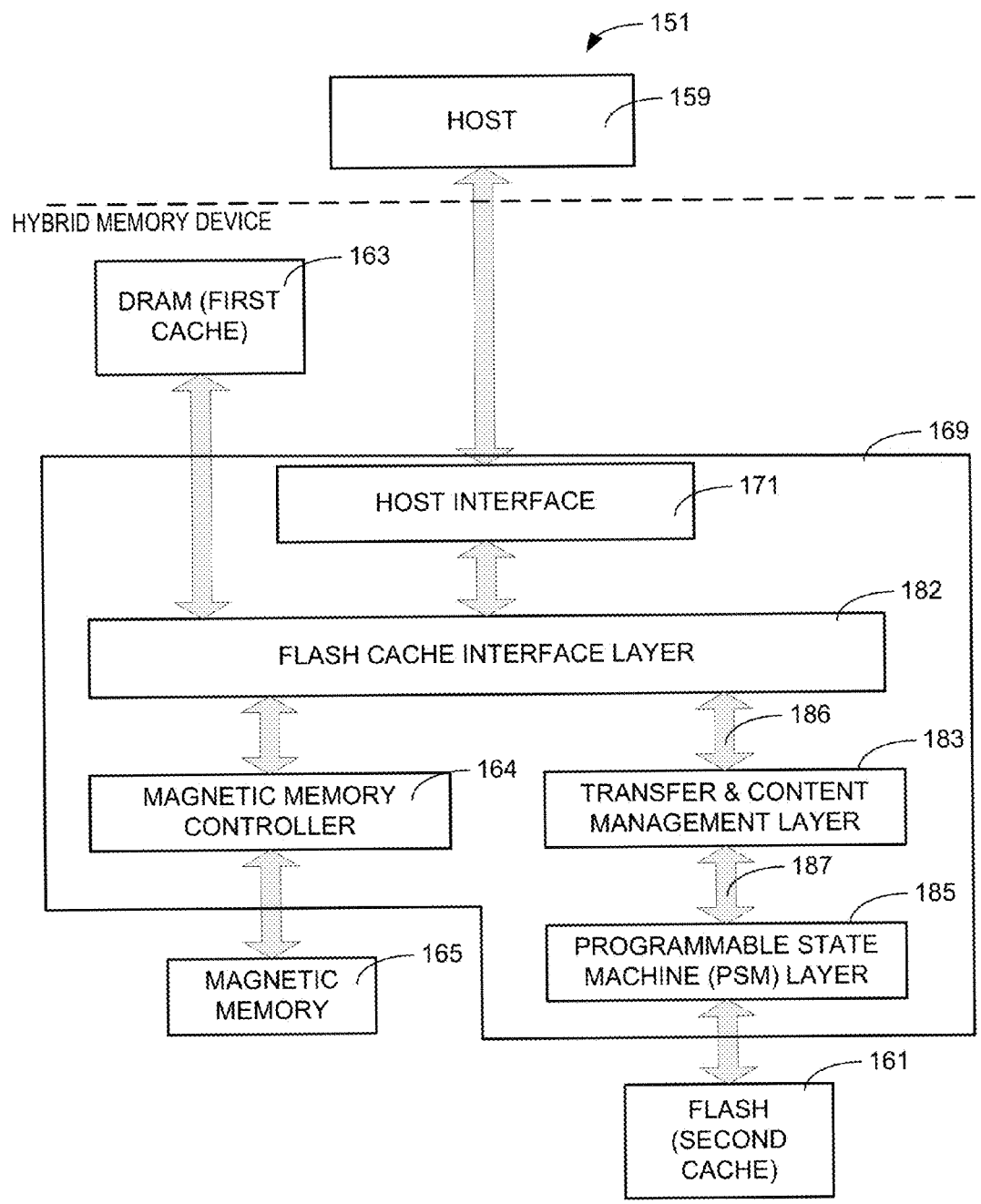
FIG. 1B is a block diagram of a hybrid memory system that includes a magnetic disk as a primary memory and a flash memory as a secondary memory, the hybrid memory system configured to manage memory access requests in accordance with some embodiments.

FIG. 1B illustrates a more detailed version of a system 151 that includes a host processor 159 coupled to a hybrid memory device. The hybrid memory device includes a magnetic memory 165 which serves as the main memory, dynamic random access memory (DRAM) 163 arranged as a first cache, and flash memory 161 arranged as a second cache. In this configuration, the flash cache 161 acts as a second cache, and may be faster but smaller than the main memory 165. The DRAM 163 serves as the first cache, and may be faster but smaller than the flash cache 161. While there is some processing and data transfer overhead in using the one or more caches 163, 161, the faster storage media used by the caches can enhance overall performance of the apparatus hybrid memory device.

The host processor 159 communicates with the hybrid memory device (also referred to herein as hybrid drive) through a host interface 171. As previously discussed, the main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory 165 are referred to herein as host LBAs.

The host 159 sends memory access requests to the hybrid memory device, for example, the host 159 may request that data be written to and/or read from the hybrid memory device. The host interface 171 is configured to transfer memory access requests from the host 159 to other components of the hybrid memory device and to transfer data between the host 159 and the hybrid memory device.

The hybrid controller 169 illustrated in FIG. 1B includes number of layers 182, 183, 185 wherein each layer communicates to its nearest neighboring layer(s), e.g., through a set of requests. For example, each layer 182, 183, 185 may only communicate to its nearest neighboring layer(s) without communicating to other layers. As an example, the layer 182 may only communicate directly to layer 183 and the host interface 171, without communicating directly with the layer 185 or to the flash 161. As an operation, such as a memory access request from the host 159, is being carried out, each layer 182, 183, 185 is configured to pass control to the next lower layer as the operation is implemented.

The example illustrated in FIG. 1B includes three layers 182, 183, 185 which are described in terms applicable to the use of flash memory as a cache. It will be appreciated that these terms are not restrictive, and if other types of memory were used as the secondary memory, if desired, different terminology could be used to reflect the type of secondary memory. Nevertheless, the basic functions of the layers can be similar, regardless of the type of memory used for primary and/or secondary memory, and/or the terminology used to describe the layers.

The layers illustrated in FIG. 1B include: the flash cache interface (FCI) layer 182; the flash cache control and transfer management (FCTM) layer 183; and the programmable state machine (PSM) layer 185. Requests and/or data may be passed between the layers as indicated by arrows 186, 187 from a higher layer to the next lower layer starting with the FCI layer 182 and proceeding to the PSM layer 185 which interacts directly with the flash memory 161. The layered architecture of the hybrid controller 169 described herein allows for handling host memory access requests which can be serviced from either the magnetic memory 165 or one of the caches 163, 161 The layered structure used in conjunction with the flash cache 161 can be configured to achieve specified rates and response times for servicing memory access requests.

The FCI layer 182 decides whether a host read request should be serviced from the primary magnetic memory 165 or from one of the caches 163, 161. The FCI layer 182 implements processes to determine which data should be promoted to the flash secondary cache 161 and/or the primary cache 163 based on various criteria to achieve optimal workload for the hybrid memory device. The flash content and transfer management (FCTM) layer 183 maintains a mapping, e.g., a fully associative mapping as discussed below, of the host LBAs to a memory space corresponding to the flash memory space arranged in clusters. The FCTM layer 183 interacts with programmable state machine (PSM) layer 185 and performs tasks such as optimal scheduling of promotion requests among dies of the flash (referred to as die scheduling), wear leveling, garbage collection and so forth.). The PSM layer programs hardware controllers to generate the required signals to read from and write to the flash 161, for example.

In some cases, one or more of the layers 182, 183, 185 of the hybrid controller 169 may be implemented by circuitry and/or by one or more processors, e.g., such as reduced instruction set computer (RISC) processors available from ARM. In some cases each layer 182, 183, 185 may be implemented by a separate processor. The processes discussed herein are implementable in hardware (interconnected electronic components that carry out logic operations) and/or by a processor implementing software instructions, e.g., stored in a computer readable medium, and/or by any combination of hardware and software.

In some implementations, the hybrid memory device includes a flash cache (e.g. as a secondary cache 161) that undergoes garbage collection to make room for incoming data. The hybrid controller 169 is configured to carry out garbage collection operations for the flash cache 161.

Figure 1C:
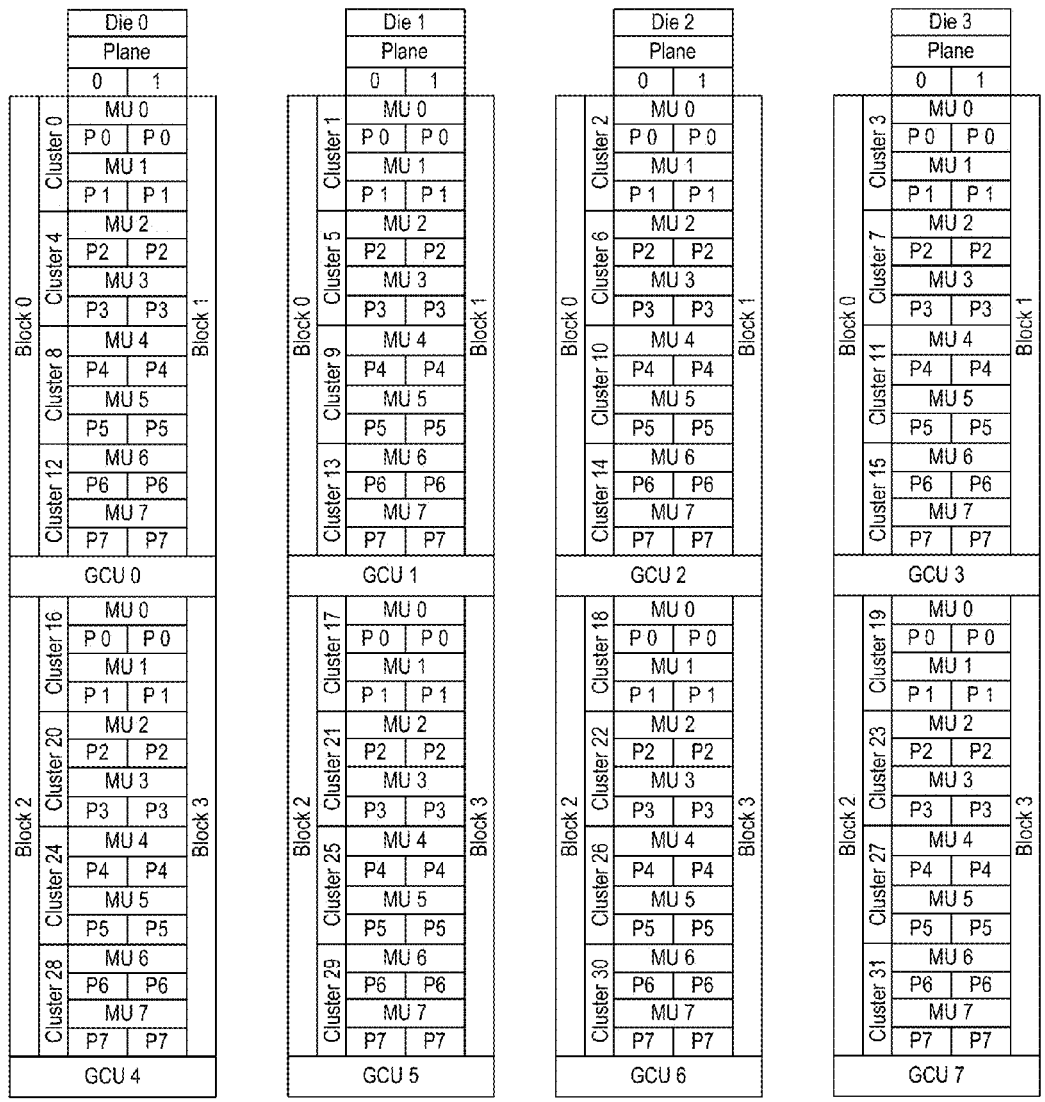
FIG. 1C illustrates a way to partition the flash into clusters according to various aspects.

As described previously, the HDD host LBA space and flash physical address space are partitioned into units of clusters that may be sized to contain a whole number of sectors of data. Protection Information (PI) and error correction data may be stored in the cluster. The flash geometry determines the cluster size. In flash geometry according to some embodiments, a cluster is defined to contain one or more map units (MU). A MU can be defined to be the maximum amount of data that can be transferred to or from the flash in a single flash operation. For example, the MU for a dual plane flash may be two pages and for quad plane may be four pages. FIG. 1C illustrates a way to partition the flash into clusters for a four die, dual plane system. Each cluster spans two planes and two MUs. There are two garbage collection units (GCUs) per die. Clusters and GCUs are intentionally defined not to span die in order to be able to handle full die failures.

Flash memory cells must be erased by applying a relatively high voltage to the cells before being written, or "programmed." For a number of reasons, these erasures are often performed on blocks of data (also referred to herein as "erase units" or "erasure blocks"). An erase unit may include any physical or logical blocks of memory that are treated as a single unit for purposes of erasure. In many implementations, erase units are contiguous physical units that are larger than the data storage units (e.g., pages) that may be individually read or programmed. In such a case, when data of an existing page needs to be changed, it may be inefficient to erase and rewrite the entire block in which the page resides, because other data within the block may not have changed. Instead, it may be more efficient to write the changes to empty pages in a new physical location, remap the logical to physical mapping for the altered blocks via the controller logic, and mark the old physical locations as invalid/stale.

After some time, numerous data storage units within a memory unit may be marked as stale due to changes in data stored within the block. As a result, it may make sense to move any valid data out of the block to a new location, erase the block, and thereby make the block freshly available for programming. This process of tracking invalid/stale data units, moving of valid data units from an old block to a new block, and erasing the old block is sometimes collectively referred to as "garbage collection." Garbage collection may be triggered by any number of events. For example, metrics (e.g., a count of stale units within a block) may be examined at regular intervals and garbage collection may be performed for any blocks for which the metrics exceed some threshold. Garbage collection may also be triggered in response to other events, such as read/writes, host requests, current inactivity state, device power up/down, explicit user request, device initialization/re-initialization, etc. In some cases, garbage collection is triggered when the last outstanding user (FCI) command completes and there are no other outstanding commands, for example Garbage collection is performed on garbage collection units (GCUs), which generally refer to physical units that are garbage collected and erased as a contiguous unit. In some flash memory implementations, the smallest size of a GCU is one erasure block. It may be possible in some implementations for a garbage collection unit to include multiple erasure blocks, and other variations between GCU size and erase unit size are also possible. For the purposes of the following discussion, the GCU may be of a predetermined size, but need not have any direct correspondence to the size of erasure units upon which garbage collection is performed.

As described above, in some storage systems that use flash based memory there is an erase before each program of a GCU. This erase process must first ensure that any valid data currently residing in that GCU is moved to another location. This process of moving the valid data and erasing the GCU may be part of a garbage collection operation. In order to find the optimal candidate for garbage collection, garbage collection metrics are maintained for the GCUs. One often-used garbage collection metric is a staleness count, which reflects the number of stale logical block addresses (LBAs) residing in a particular GCU. In some cases, a table is maintained to track the staleness of all GCUs. Additionally or alternatively, a binary max heap may be created with staleness as the comparison function. A binary heap is a tree. The root node of the heap may be the GCU with the maximum staleness. The root node is selected as the candidate GCU. Other characteristics may also be considered when forming a garbage collection metric.

In some cases, a GCU is made up of one or more clusters. For example, each GCU may contain 128 or 256 clusters. As described above, staleness of a GCU is defined as the number of clusters in a GCU that no longer contain valid data. Clusters may become invalid as a result of invalidations from the FCI layer or as a result of evictions. Evictions can be used to maintain a predetermined amount of over provisioning, for example. Garbage collection of a GCU involves cluster migration and erase of the GCU.

Figure 2:
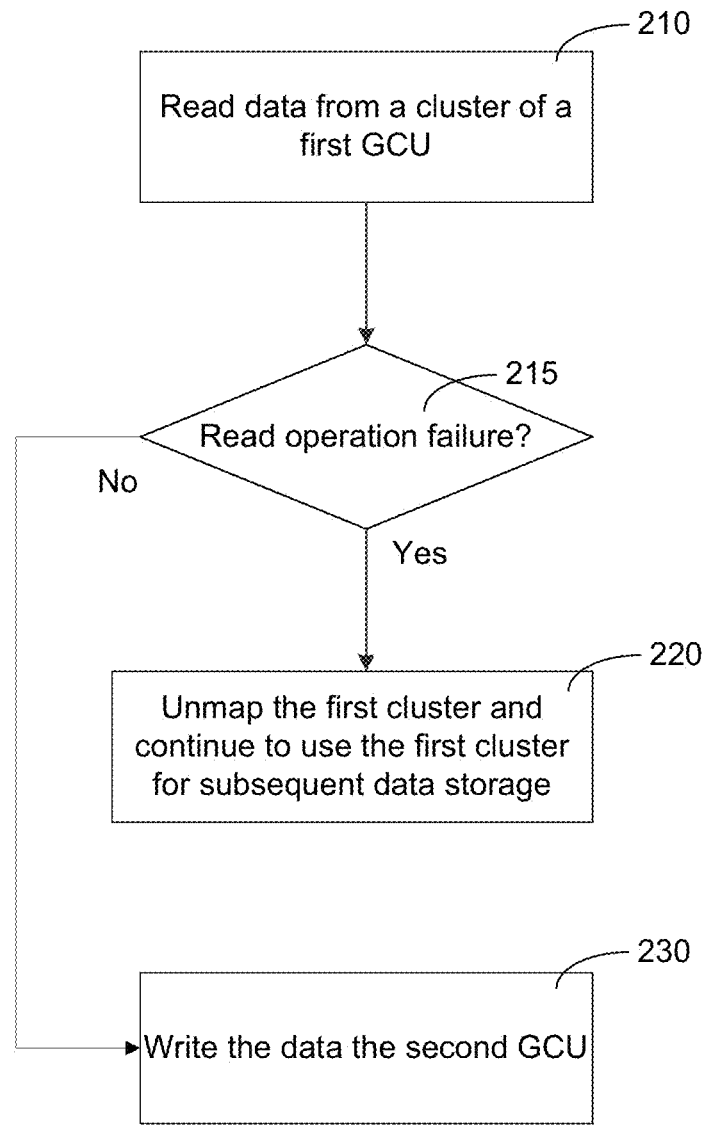
FIG. 2 is a flow diagram that illustrates a method for garbage collection in a hybrid system according to some embodiments.

FIG. 2 is a flow diagram that illustrates a method for garbage collection in a hybrid system according to some embodiments. In this example, the GCUs are made up of several data clusters. Consider the scenario where a first plurality of clusters of a first GCU are being garbage collected to a second plurality of clusters of a second GCU. Data is read 210 from a cluster of the first plurality of clusters of the first GCU. Responsive to a determination that the read operation failed 215, the cluster is unmapped 220 without writing the data of the cluster to a cluster of the second GCU. The cluster that experienced the read operation failure continues to be used for subsequent data storage. In a system that does not have a cache, the cluster that experienced the read operation failure may be defected (placed on a list of clusters that are not used because of defects) if a read operation fails. This is because in a system without a cache, there is no redundant copy of the data, thus clusters that have experienced one or a small number of read failures are defected so that the storage is robust. According to various aspects of the present disclosure, the hybrid system continues to use a cluster even if a read fails. In the hybrid configurations disclosed herein there may be less concern for losing the data in the cache because a second redundant copy of the data is stored on the primary memory, i.e., the magnetic disk. Responsive to a determination that the read operation did not fail 215, data from the cluster is written 220 to cluster of the second GCU.

Figure 3:
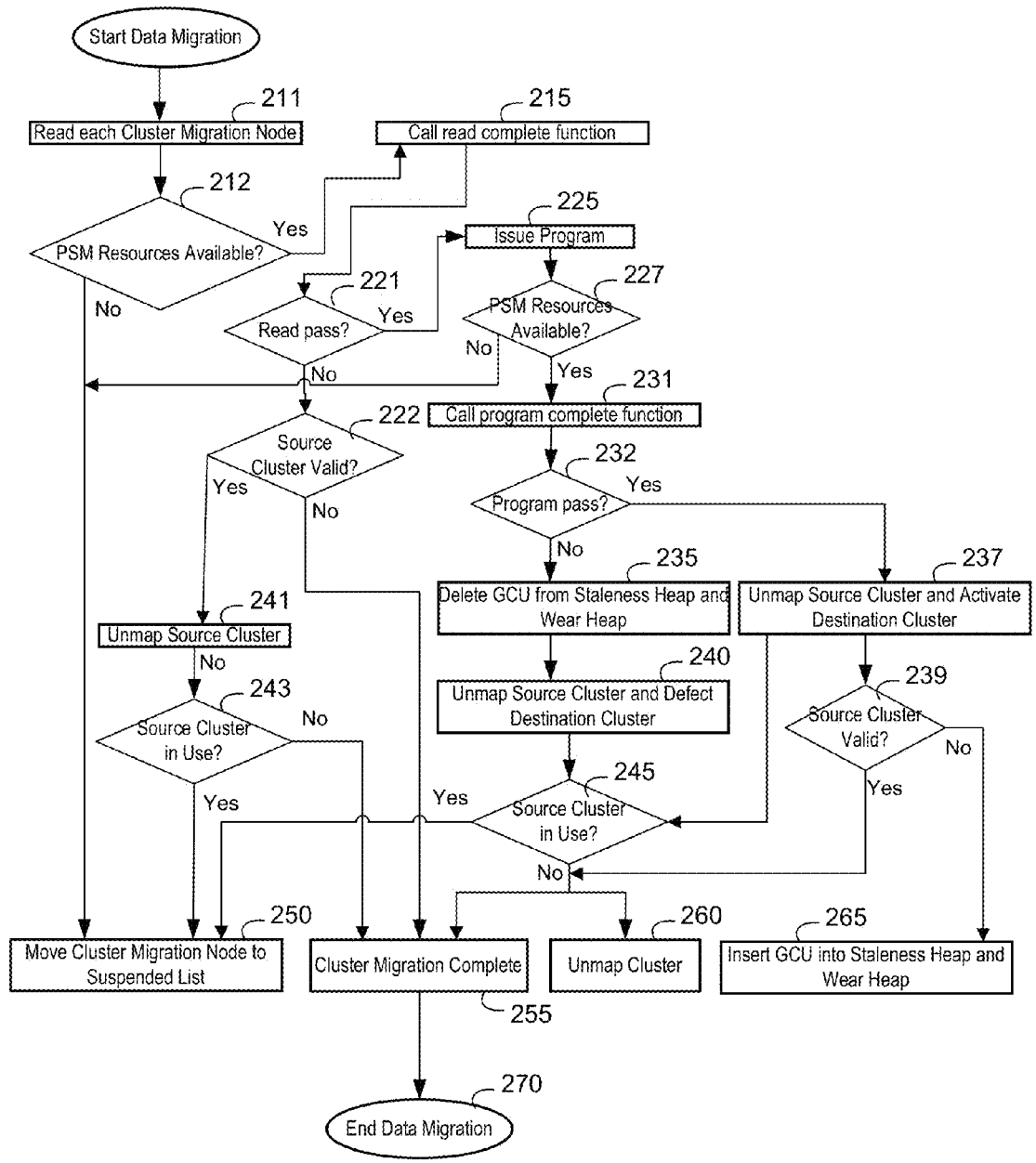
FIG. 3 illustrates a process for cluster migration in accordance with various aspects.

As described previously, a garbage collection process involves the movement of data from a first GCU that is undergoing garbage collection (where garbage collected data is being collected from) to a second GCU where the data from the first GCU is being collected (where the garbage collected data is being collected to). This movement of data may involve a cluster migration process. FIG. 3 illustrates a process for cluster migration. The process of migrating clusters for a GCU is accounted for using a cluster migration node. For each valid cluster in the GCU, a read cluster operation is performed 211 and the data is read into a holding region. To enable faster garbage collection operations, multiple concurrent cluster migrations may be supported, e.g., across multiple planes and/or across multiple die of the cache. According to various implementations, the holding region is as large as the maximum number of concurrent cluster migrations supported. For example, in a four die system, the maximum number of cluster migrations supported may be eight. The system checks 212 if there are enough resources in the PSM layer to implement the read operation. If there are not enough resources, the read operation is suspended 250 until there are enough PSM resources to complete the read operation. A suspend list is used to track clusters waiting for PSM resources and to track clusters waiting for an unmap operation due to the cluster being in use. A separate bitmap may be maintained for cluster in use by a host read command. At the end of the host read, if this list is non-empty and the cluster in use has completed, the unmap is performed. If it is determined 212 that there are enough PSM resources for a read, the system calls 215 a function that indicates that the read is complete on the flash.

It is determined 221 if the read of the flash was completed successfully. If the read fails 221, the source cluster is unmapped and migration for this cluster ends. As described above, read failures do not cause a block to be defected because there is another copy of the data on the primary memory. If the read passes 221, a program command is issued 225 for the read data to be written to a fresh cluster that is selected from the garbage collection ready list. There may be more than one set of garbage collection ready lists for different types of data. For example, there may be one ready list set for user data and one ready list set for system data. Maintaining more than one ready list set may help to maintain a program order and/or to control overprovisioning of the memory unit.

The system determines 227 if there are enough resources at the PSM layer to complete the program operation. If there are not enough resources, the program operation is suspended 250 until there are enough resources to complete the program. If it is determined 227 that there are enough resources to complete the program operation, the program complete function is called 231. It is determined 232 if the program operation passes or fails. If the program operation passes 232, the source cluster is unmapped and the destination cluster is activated 237. If the source cluster is in use 245 for an in progress flash cache hit, it cannot be unmapped and is sent to the suspend list and has to wait for the user read operation to complete.

According to various implementations, the FCTM layer includes an overlap checker configured to determine if there is an overlap between the memory access requests. An overlap may occur if there is an overlap in the host LBA ranges of two memory access requests. In some cases, an overlap checker may check for read operations that are rounded out to a cluster boundary since it is possible for requests to non-overlapping sectors within the same cluster to occur. Due to this, the source cluster may not be immediately unmapped.

It is determined 239 if the source cluster is valid, i.e., contains valid data. If the source cluster is valid, the cluster is unmapped 260 and the cluster migration is complete 255. If the source cluster is not valid 239, i.e., does not contain valid data, the GCU is inserted into the staleness heap and the wear heap. The staleness heap and the wear heap are data structures that are used to select GCUs for garbage collection according to staleness and wear leveling criteria. If the program fails, the GCU is deleted 235 from the staleness heap and the wear heap, the cluster is unmapped 260, and the cluster migration is complete 255. The data migration process ends 270.

After all valid data is migrated out of the candidate GCU, the GCU is erased and the clusters within the GCU are added to the ready list. If the GCU is defective (has had a program error previously) the clusters in the GCU are "defected" and moved to a defect list and the GCU is marked as being defective. If the erase operation fails, all clusters are moved to the defect list and the GCU is marked defective. The decision as to which ready list (user or system, for example) receives the erased clusters is based on the current length of each of the ready lists. A low water mark value and a high water mark value are defined for each of the ready lists. For example, the high water mark value may be 1 GB and a low water marker value may be 512 MB. According to various embodiments, the high water mark values and the low water mark values impact behavior such as overall system performance and may be tuned for different products and NAND flash parts from different vendors. If the system ready list is below the low water mark, the system ready list will receive the erased clusters. Once the system ready list is above the low water mark, the user ready list will receive the erased clusters. Garbage collection may continue until both lists are at least as long as their high water marks.

As described above, a read error may not result in defecting of a block because a redundant copy of data is stored in the primary memory. In some cases, a read error may be remedied in response to a block being programmed and used again. The chance of the read error being remedied depends on a number of factors such as the relaxation time, the number of program/erase cycles experienced by the memory unit, temperature, among others. Defecting a memory unit due to a read error may result in unnecessary loss of capacity, particularly when the read error results from a transitory condition that can be remedied. It may be beneficial to be able to disable a defecting process to preserve capacity, particularly when redundant data is available.

Figure 4A:
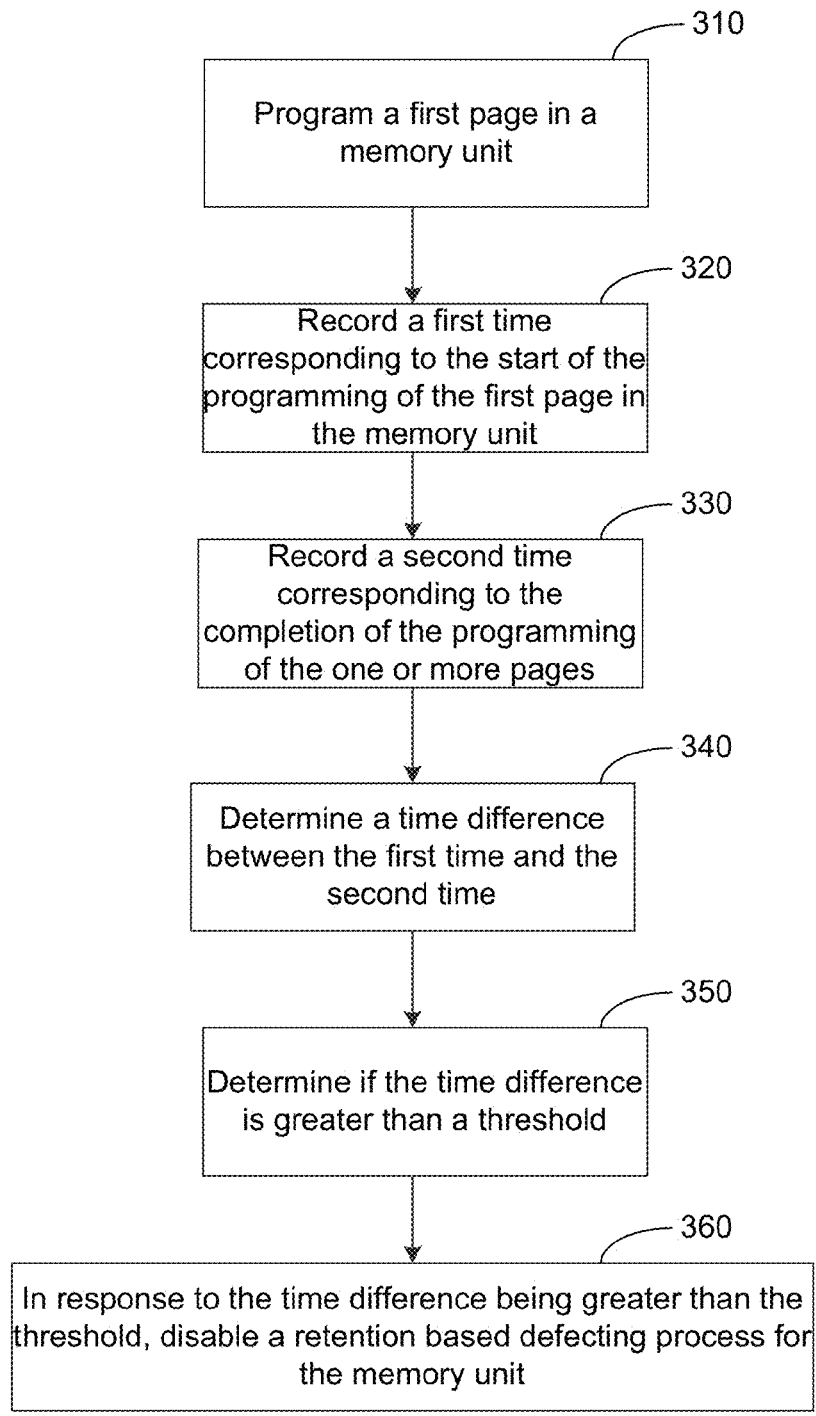
FIG. 4A illustrates a process for disabling a defecting process in accordance with various aspects.

FIG. 4A illustrates a process for disabling a defecting process. A first page in a memory unit is programmed 310. A first time ($t_1$) is recorded 320. The first time corresponds to the start of the programming of the first page in the memory unit. According to various implementations, the memory unit corresponds to a garbage collection unit (GCU). A second time ($t_2$) is recorded 330 that corresponds to the completion of the programming of one or more pages. A time difference ($\Delta t = t_2 - t_1$) is determined 340 between the first time and the second time. It is determined 350 whether the time difference is greater than a threshold. The threshold may be dependent on various factors. For example, the threshold may be a function of the retention time of the data stored in the memory unit. For example, the threshold may be higher if the retention time of the data stored in the memory unit is approaching the retention time indicated in the product specification, e.g. 3 days or months. According to various implementations, the threshold is in between 50% of the retention time recorded in the product specification (t_retention_spec) and the t_retention_spec such that 50% of t_retention_spec<$\Delta t$<t_retention_spec, for example. According to various implementations, the threshold is 80% of t_retention_spec.

In response to the time difference being greater than the threshold, a retention based defecting process is disabled 360 for the memory unit. A larger time difference may indicate that the memory unit has a large relaxation time. A relaxation time is the time duration between two sequential program or erase events of the same memory unit. A larger relaxation time may indicate that the memory unit has less damage than other memory units. According to various aspects, the time difference being greater than the threshold indicates that the chance for the memory unit to have a read failure is low.

In some implementations, the threshold may be a function of more than one factor. For example, the threshold may be a function of one or more of the retention time, the number of program/erase cycles experienced by the memory unit, and/or the temperature of the memory unit. If the threshold is a function of more than one factor, a similar process may be used to the process shown in FIG. 4A for each of the factors. Alternatively, weighting coefficients can be applied to the factors, the weighted factors can be combined and compared to a composite threshold. In some cases, the process of determining whether to disable a defecting process if the time difference is greater than a threshold (see blocks 350 and 360) may be checked periodically. Alternatively or additionally disabling the defecting process may be performed in response to a read error in the memory unit, for example. In some cases, the process of FIG. 4A is carried out in conjunction with a garbage collection operation.

In the event that the time difference is less than the threshold, the memory unit may be defected because the chance of a read error occurring is high, for example. In some cases, if the time difference is less than the threshold and a read error occurs, a counter is incremented. If the value in the counter rises above a threshold, e.g. 2 or 4, the memory unit may be defected during the next garbage collection process, for example.

Figure 4B:
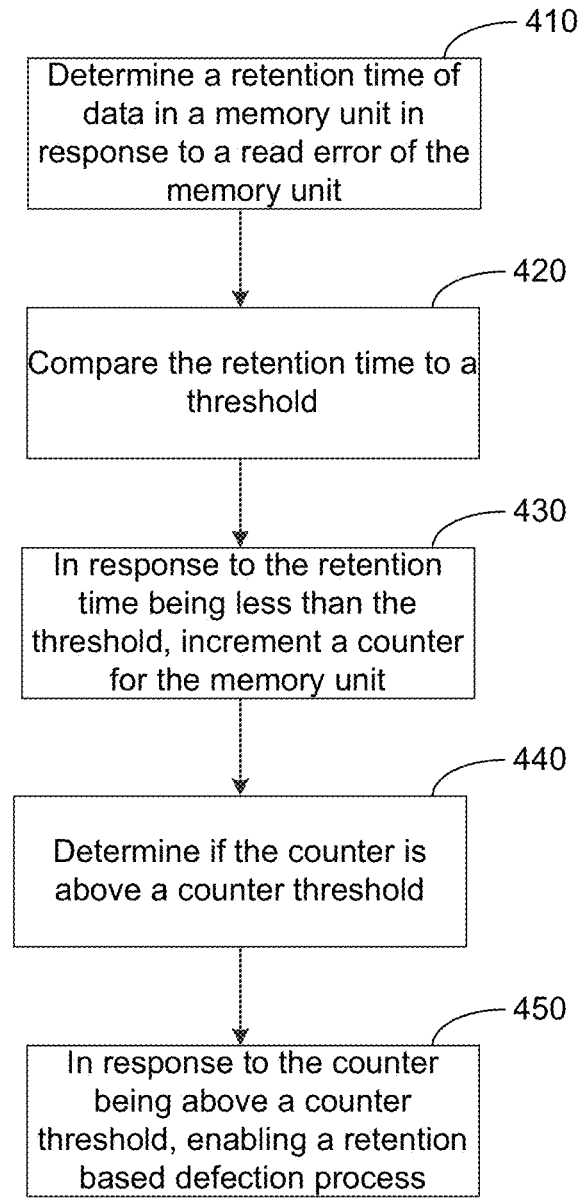
FIG. 4B shows a process for utilizing a counter to enable or disable a defecting process according to some implementations.

FIG. 4B shows a process for utilizing a counter to enable or disable a defecting process. A retention time of data in a memory unit is determined 410 in response to a read error. The retention time of the memory unit is compared 420 to a threshold. In response to the retention time being less than the threshold, a counter for the memory unit is incremented 430. It is determined 440 whether the counter is above a counter threshold. In response to the counter being above the counter threshold, a retention based defecting process is enabled 450. The retention based defecting process is disable while the counter is below a threshold.

Figure 5:
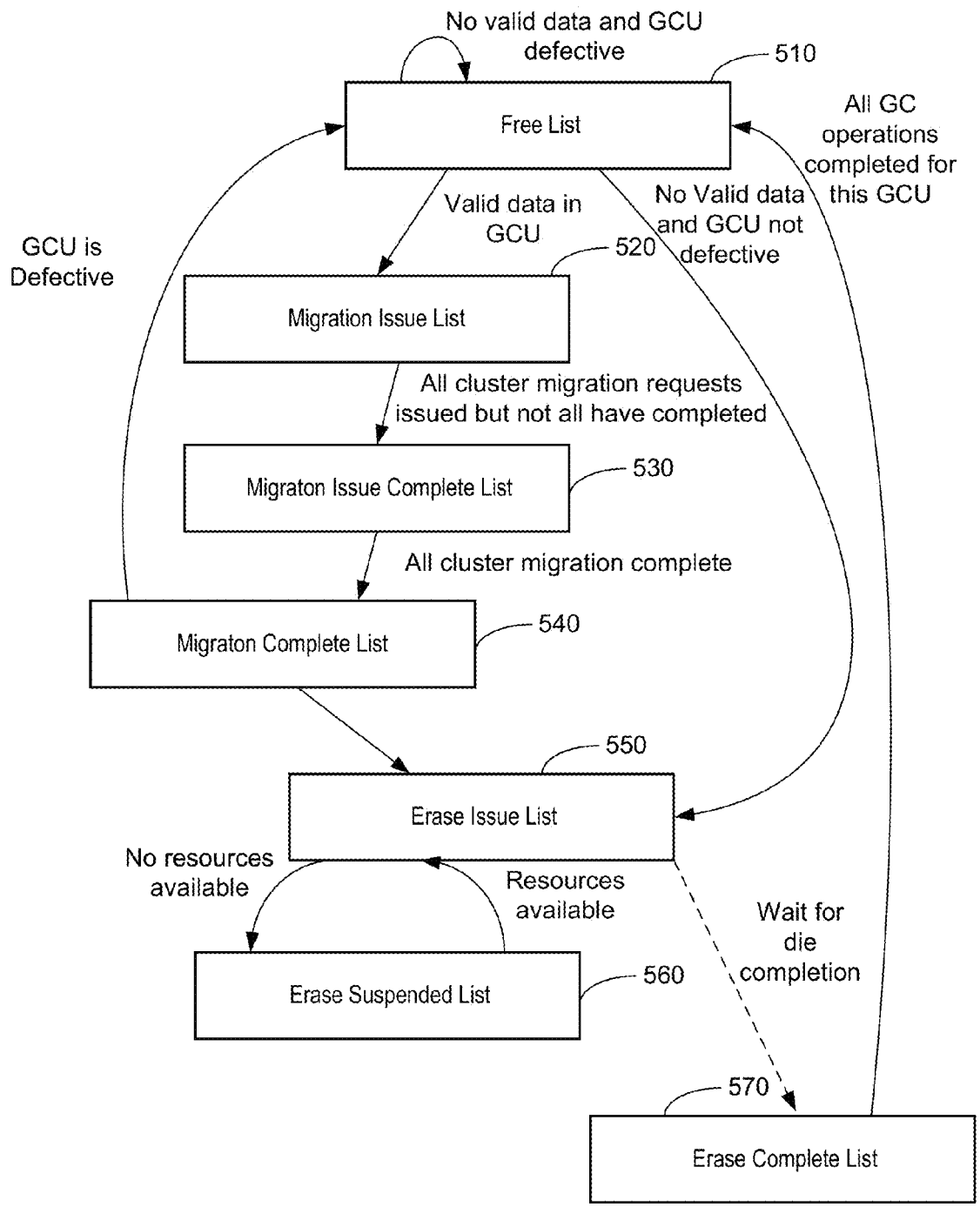
FIG. 5 illustrates another example of cluster migration in conjunction with a garbage collection process according to some embodiments.

According to various implementations uses one or more lists to carry out the embodiments described herein. The lists can be used in the scheduling of various tasks and/or for assigning a priority to tasks, for example. FIG. 5 illustrates another example of cluster migration in conjunction with a garbage collection process that utilizes various lists to aide in the garbage collection process. When the garbage collection process is initiated, the system checks whether there is valid data in the candidate GCU from the Free List 510 and whether the candidate GCU is defective. If there is no valid data in the candidate GCU and the candidate GCU is defective, the system continues on to the next candidate GCU. If there is valid data in the candidate GCU and the GCU is not defective, the GCU is moved to the Migration Issue List 520. Once all of the cluster migration requests for the GCU have been issued, but not yet completed, the GCU is moved to the Issue Complete List 530. The GCU is moved to the Migration Complete List 540 once the cluster migration request is complete. If the GCU is determined to be defective the system returns to the Free List 510 to process the next candidate GCU. Once the data migration is complete, an erase is issued for the GCU and the GCU is placed in the Erase Issue List 550. If there are not currently enough resources for the erase, the GCU is placed in the Erase Suspended List 560 until the resources are available. If there are enough resources available for the erase, the erase is completed and the GCU is placed in the Erase Complete List 570. Once the erase is complete for the GCU, the system returns to the Free List 510 to determine the next candidate GCU for garbage collection. In the event that there is no valid data and the GCU is not defective, the cluster migration does not have to be completed, and the GCU moves to the Erase Issue List 550.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method of performing garbage collection in a hybrid memory system that includes a primary memory and a secondary memory, the method comprising:
    performing a read operation comprising reading data from a first cluster of a plurality of clusters;
    responsive to a determination that the read operation failed:
        unmapping the first cluster without writing the data to a second cluster;
        determining a programming time for the first cluster;
        if the programming time is greater than a first threshold, continuing to use the first cluster for subsequent data storage;
        if the programming time is less than or equal to the first threshold, increment a counter;
        determining if the counter is greater than a second threshold; and
        if the programming time is less than or equal to the second threshold, defecting
    the first cluster; and
    responsive to a determination that the read operation did not fail, writing the data to the second cluster.

2. The method of claim 1, wherein upon completion of a successful write of the data to the second cluster, unmapping the first cluster.

3. The method of claim 1, wherein upon failure to write to the second cluster, unmapping the first cluster.

4. The method of claim 1, further comprising grouping one or more clusters of the plurality of clusters into one or more garbage collection units (GCUs).

5. The method of claim 4, wherein the first cluster is located in a first GCU and the second cluster located in a second GCU different from the first GCU.

6. The method of claim 4, further comprising erasing the GCU.

7. The method of claim 6, further comprising:
receiving incoming memory access requests from a host processor;
routing the incoming memory access requests to a set of incoming queues;
transforming each incoming memory access request into one or more outgoing memory access requests;
routing the outgoing memory access requests from the incoming queues into a set of outgoing queues.

8. The method of claim 7, wherein the outgoing queues include one or more of:
a set of ready lists, each ready queue of the set of ready lists configured to queue memory access requests that are ready for execution.

9. The method of claim 8, wherein the set of ready lists comprise a user ready list and a system ready list.

10. The method of claim 9 further comprising:
adding erased GCUs to the system ready list if the length of the system ready list is below a predetermined threshold; and
adding erased GCUs to the user ready list if the length of the system ready list is above a predetermined threshold.

11. The method of claim 4, further comprising determining a staleness count for the one or more GCUs.

12. The method of claim 11, wherein determining a staleness of the one or more GCUs comprises determining the number of clusters in the one or more GCUs that contain invalid data.

13. A device, comprising:
a hybrid controller configured to manage data transfers between a host processor and a secondary memory, the secondary memory configured to serve as a cache for a primary memory, the controller configured to:
perform a read operation comprising reading data from a first cluster of a of a plurality of clusters of the secondary memory;
responsive to a determination that the read operation failed:
unmap the first cluster without writing the data to a second cluster;
determine a programming time for the first cluster;
if the programming time is greater than a first threshold, continue to use the first cluster for subsequent data storage;
if the programming time is less than or equal to the first threshold, increment a counter;
determine if the counter is greater than a second threshold; and
if the programming time is less than or equal to the second threshold,
defect the first cluster; and
responsive to a determination that the read operation did not fail write the data to the second cluster.

14. The device of claim 13, wherein upon completion of a successful write of the data to the second cluster, the controller is further configured to unmap the first cluster.

15. The device of claim 13, wherein upon failure to write to the second cluster, the controller is further configured to unmap the first cluster.

16. The device of claim 13, wherein the controller is further configured to group one or more clusters of the plurality of clusters into one or more garbage collection units (GCUs).

17. The device of claim 16, wherein the first cluster is located in a first GCU and the second cluster located in a second GCU different from the first GCU.

18. A controller system for a hybrid memory system, the controller comprising:
a hybrid controller configured data transfers between the host processor and a flash memory, the flash memory configured to serve as a cache for a magnetic disk, the hybrid controller configured to:
perform a read operation comprising reading data from a first cluster of a plurality of clusters;
responsive to a determination that the read operation failed:
unmap the first cluster without writing the data to a second cluster;
determine a programming time for the first cluster;
if the programming time is greater than a first threshold, continue to use the first cluster for subsequent data storage; and
if the programming time is less than or equal to the first threshold, increment a counter;
determine if the counter is greater than a second threshold; and
if it is determined that the counter is greater than the second threshold, defect the first cluster; and
responsive to a determination that the read operation did not fail, write the data to the second cluster.

19. The controller system of claim 18, wherein the controller is further configured to
unmap the first cluster upon completion of a successful write of the data to the second cluster; and
unmap the first cluster upon failure to write to the second cluster.

20. The controller system of claim 18, wherein the controller is further configured to group one or more clusters of the plurality of clusters into one or more garbage collection units (GCUs) and wherein the first cluster is located in a first GCU and the second cluster located in a second GCU different from the first GCU.

* * * * *